US008326654B2

(12) United States Patent
Saunier

(10) Patent No.: US 8,326,654 B2
(45) Date of Patent: Dec. 4, 2012

(54) PROVIDING A SERVICE TO A SERVICE REQUESTER

(75) Inventor: Louisa Saunier, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 579 days.

(21) Appl. No.: 12/105,417

(22) Filed: Apr. 18, 2008

(65) Prior Publication Data

US 2008/0263547 A1 Oct. 23, 2008

(30) Foreign Application Priority Data

Apr. 23, 2007 (EP) .................................... 07300974

(51) Int. Cl.
*G06Q 40/00* (2012.01)
(52) U.S. Cl. .................... 705/4; 340/5.2; 705/7; 705/26; 705/35; 705/40; 705/44
(58) Field of Classification Search ........................ None
See application file for complete search history.

(56) References Cited

U.S. PATENT DOCUMENTS

| 7,161,465 B2* | 1/2007 | Wood et al. .................... 340/5.2 |
| 7,496,964 B2* | 2/2009 | Renfro et al. .................... 726/25 |
| 7,676,435 B1* | 3/2010 | Berstis ............................. 705/44 |
| 2002/0082852 A1* | 6/2002 | Greene et al. ..................... 705/1 |
| 2002/0184103 A1* | 12/2002 | Shah et al. ....................... 705/26 |
| 2003/0236728 A1* | 12/2003 | Sunderji et al. ................... 705/35 |
| 2006/0089906 A1* | 4/2006 | Rowley ............................ 705/40 |
| 2006/0236395 A1* | 10/2006 | Barker et al. .................... 726/23 |

FOREIGN PATENT DOCUMENTS

WO WO 01/88674 * 11/2001

OTHER PUBLICATIONS

Fussell, L.; Field, S; "The role of the risk management database in the risk management process" Systems Engineering, 2005 ICSEng 2005. 18th International Conference on Aug. 16-18, 2005 pp. 364-369.*

* cited by examiner

*Primary Examiner* — Robert Niquette

(57) ABSTRACT

A data processing system for providing a service to a service requester is provided. The data processing system includes a filtering module to receive a request for a service from the service requester, and a ticket module to create a ticket. The ticket includes a risk profile level which is one of a predefined number of levels. The system further includes at least a first and second rule. The first rule specifies a control and the risk profile level response to a result obtained from the service requester. The second rule specifies a maximum acceptable risk profile level required to serve the service. An interface includes an output module to output the control to an agent and an input module to allow input of the service requester's response to the control. A modifier modifies the risk profile level according to the first rule and the service requester's response. The modifier compares the risk profile level with the maximum acceptable risk profile level. A service provision module allows the service to be performed if the risk profile level is less than or equal to the maximum acceptable risk profile level.

14 Claims, 2 Drawing Sheets

PROVIDING A SERVICE TO A SERVICE REQUESTER

CROSS-REFERENCE TO RELATED APPLICATION

This claims priority under 35 U.S.C. §119 to EP Patent Application No. 07300974.8, filed Apr. 23, 2007, which is hereby incorporated by reference.

BACKGROUND

Help desks often provide a variety of IT services. They are often subject to service level agreements which specify levels of performance and service. A help desk needs to be able to provide a range of services to legitimate users. Help desks may be the subject of social engineering attacks in which unauthorized users attempt to gain access to services.

BRIEF DESCRIPTION OF THE DRAWINGS

In the following embodiments of the present invention will be described by way of example only and with reference to the drawings in which.

DETAILED DESCRIPTION

Figure 1:
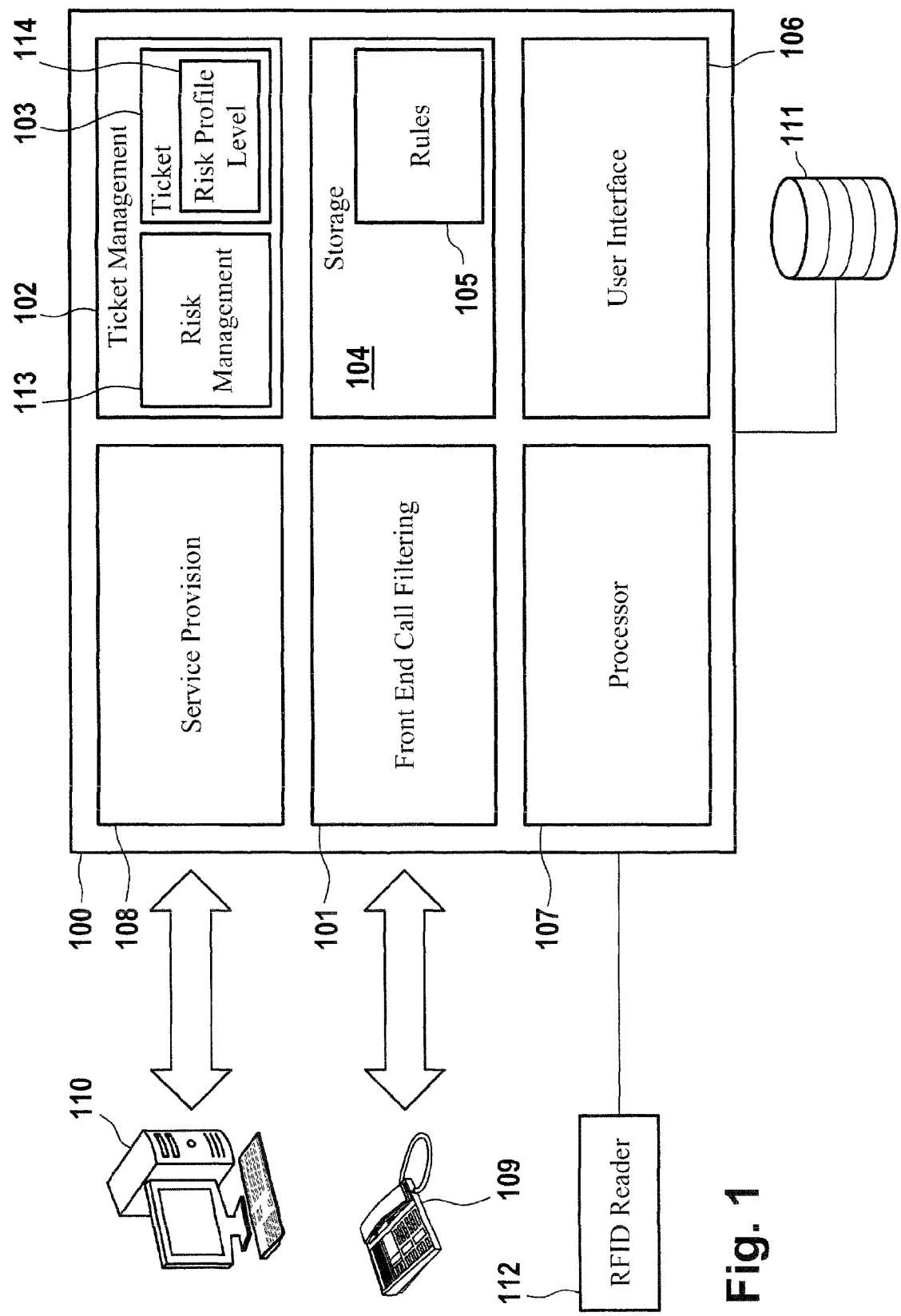
FIG. 1 is a block diagram of a system for providing a service to a service requester according to an embodiment of the present invention.

In accordance with an embodiment of the present invention, there is provided a system for delivering a service to a service requester. The system comprises a filtering module adapted to receive a request for a service from a service requester, a ticketing module adapted to create a ticket and to store the ticket, the ticket comprising a risk profile level. The system further comprises at least a first and a second rule which specify a control and how to change the risk profile level as a result of the service requester's response to the control, the rules further specifying a maximum acceptable risk profile level required to serve the service. An initial risk profile level is established by the front end call filtering module based on a set of controls implemented at this module. The system further comprises an interface which has an output module which is adapted to output the control to an agent and an input module which is adapted to allow the agent to input the service requester's response to the control. The system further comprises a modifier to modify the risk profile level according to a first rule. The system further comprises a service provision module for providing the service which is adapted to allow the agent to perform the service if the risk profile level is less than or equal to the maximum acceptable risk profile level required to serve the service.

Embodiments of the present invention allow a risk profile level associated with a ticket to be embedded in a ticket management system such as 'Peregrine' or 'OpenView Service Desk' from Hewlett Packard. Further, automated risk level calculation is combined with call answering and ticket management. Embodiments of the present invention facilitate adaptive risk management which means that the risk profile level can be modified and adapted to the circumstances of the call (e.g. caller ID is different than expected one, user behavior seem suspicious according to the agent's judgment, etc.). This can be at an automated call filtering stage and/or at a stage where the service requester interacts with a human operator or agent.

Embodiments of the present invention are particularly advantageous because different risk levels can be required for different services. This allows fewer controls to be used for a requester having a request defined in advance as representing low security risk but a larger number of controls to be used for a requester requesting a service defined in advance as representing high security risk. This reduces the workload on the telephone operator and thus allows efficient operation of the help desk. Further the system allows a wide variety of controls to be implemented or integrated additionally if needed to verify the requester's identity.

According to an embodiment of the present invention the filtering module comprises a website on which the requester can submit a service request.

According to an embodiment of the present invention the filtering module comprises an automated telephone system linked to the risk management module. These embodiments of the invention are particularly advantageous as the workload of the agent is reduced as the initial risk assessment is done and the initial risk profile level is set at the level of the automated telephone system without human involvement.

According to an embodiment of the present invention the system is operable to read a database and retrieve data concerning the service requester.

According to an embodiment of the present invention the input module is adapted to include a means for an agent indication of suspicious behavior on the part of the service requester. This allows the behavior of the service requester during the call or the circumstances of the call (e.g. unusual CallerID, requester seem not aware of well established company rules, requester is flirting or threatening, etc.) to be incorporated into the risk profile level.

According to another embodiment of the present invention the system includes an override functionality of the risk profile level. This embodiment of the invention allows an override of the risk profile level as the result of human judgment.

According to an embodiment of the present invention the ticket management module is further operable to close the ticket and comprise storage for closed tickets. This embodiment is particularly advantageous as stored tickets can be retrieved and risk analysis can take place on the stored tickets. Since the data in the stored tickets includes the risk profile level, this could help to detect whether there is a data integrity problem by detecting inconsistencies between the enterprise directory and the data provided by the requester. Further, potential social engineering attacks may be detected.

According to an embodiment of the present invention the system further comprises a connection to a radio frequency identification reader at the service requester's location. This embodiment of the invention allows the requester's physical location to be verified.

According to an embodiment of the present invention a method for providing a service to a service requester is provided. The method comprises receiving entry of a request, establishing an initial risk profile level based on outputting at least one control by the automated telephone system and receiving and comparing the user input with the expected answers stored in a database and associating it with the service request, outputting at least one control to be verified by an operator, receiving input of the result of the verification, modifying the risk profile level using the result of the verification and a stored rule, comparing the risk profile level with a maximum acceptable risk profile level for the requested service, and allowing the operator to perform the service if the risk profile level is less than or equal to the maximum acceptable risk profile level for the requested service.

According to a further embodiment of the present invention the at least one control may be a request for a code which is published on an intranet site. This embodiment of the invention allows the verification that the service requester has access to an internal intranet.

According to a further embodiment of the present invention the method further comprises steps of determining contact details from a database and displaying contact details to the operator, and receiving an input of a result of a contact attempt from the agent. This embodiment of the invention allows the identity of the service requester to be verified by contacting a colleague or manager of the service requester. The risk profile level of the ticket may be displayed to the agent while verifying the identity of the service requester.

According to a further embodiment of the present invention there is provided a computer program product comprising computer executable instructions for establishing a risk profile level associated with a service request. The instructions are operable for receiving a service request from a requester, establishing a risk profile level, outputting a control, receiving input of the service requestor's response to the control and modifying the risk profile level using the requestor's response.

Referring now to FIG. 1 an exemplary data processing system 100 is shown. The system comprises a front end call filtering module 101 which receives a request from a service requester, applies in an automated manner a set of rules 105 (the set might be empty) and outputs an initial risk profile level 114. The system 100 further comprises a ticket management module 102 which is adapted to create a ticket 103 and store the ticket 103. The ticket comprises a risk profile level 114 which is one of a predefined set of levels. The ticket management module further comprises a risk management module 113. The risk management module is connected to the front end call filtering module 101. The system 100 further comprises storage 104 of sets of rules 105. The system further comprises a user interface module 106. The user interface module 106 is adapted to output a control to an agent and is adapted to allow the agent to input the service requester's response to the control. The user interface module 106 is linked to the risk management module 113 and provides the response by the service requester to the risk management module 113. Thus the initial risk profile is automatically provided to the ticketing system. The system further comprises a processor 107. The processor is operable to modify the risk profile level according to the rules 105. The processor is further operable to compare the risk profile level with a maximum acceptable risk profile level required to serve the requested service. This system comprises a service provision module 108 for providing the service.

A service requester with a service request may contact the system through a communication system such as telephone 109. The communication system can be a voice over IP, fixed line, wireless phone, or mobile telephone system. The telephone call is subject to filtering by the front end call filtering module 101, this may be through an automated telephone system where the requester is asked to use a touch tone phone to answer questions and input information, or voice recognition software may be used to determine the nature of the service requester's problem. The front end filtering module may determine the service requester's telephone number using caller ID.

The front end call filtering module 101 may also take the form of a website, with the service requester accessing the website through a computer 110. The service requester may then be given a ticket number and the help desk may call the service requester on their telephone 109. The user could also be provided with a one time password by the website. To access the website the user may need to be authenticated as inside the intranet, this could be done via a centralized access control system such as SelectAccess or SiteMinder. The ticket could be automatically created by the website and user information could be loaded onto the service desk after being retrieved from a database 111. The retrieved data could include the requestor's employee number, manager's name, phone numbers, fax numbers, organization, location, employment status, or PC serial number. When accessing the front end call filtering module 101, the service requester could be asked to pass a radio frequency identification reader 112. This would allow the service requester's location to be verified.

Once the caller has established a ticket in the front end call filtering module 101, a ticket 103 is created by the ticket management module 102. The ticket may include a unique identifier identifying the service request. The ticket includes a risk profile level. The risk profile level takes one of a number of different values for example, green, yellow, blue or red with green indicating a low risk, yellow indicating a medium risk, blue indicating a high risk and red indicating a critical risk. The risk profile level is associated with a particular call or a particular ticket number. The risk profile level evolves during the call or the service request. The storage 104 stores rules determining how to change the risk profile level according to the user's responses or actions. The rules 105 include a maximum acceptable risk profile level associated with different categories of service request. In order to be granted a service, the risk profile level of the ticket or service request must not exceed the maximum acceptable risk level for that service.

The rules 105 stored in storage 104 contain controls or conditions or questions to be asked to the service requester by the help desk agent. Some of the controls may also be verified during the front end call filtering stage by the front end call filtering module 101. An initial risk profile level is established by the front end call filtering module based on a set of rules 105 implemented at this module. The type of service requested may be included in the initial risk profile level.

The controls may include identity information related checks, for example the service requester's name and its spelling may be checked, the service requester's employee number, phone number or caller ID may also be checked. This data could be checked against that stored in database (e.g. enterprise directory) 111.

The controls may include the service requester's employment status verification. This could include automatic verification of the service requester's employment status against an enterprise details database. It could also include contacting the service requester's manager using a phone number listed in a company directory in order to verify the service requester's identity and current employment status. The agent may be notified of the service requestor's current risk profile level before verification of the requestor's identity.

In addition to verifying the caller's employment status it may also be verified that the caller has authorization for a particular type of request. Confirming authorization may involve checking authorization lists or obtaining authority from a manager or information owner.

The controls may also include system related checks. The system related checks include the account name of the service requester or details of the service requester's hardware and serial numbers. These numbers could be checked against the ones in assets databases.

Organization related checks could also be carried out. These include checking whether the service requester is aware of the manager's name or other team members' names and details of a location such as building names. This data is checked against that in the enterprise directory.

A further control could include the behavior of the service requester. The input means of the user interface 106 could include a field which the agent could flag as suspicious.

A further control group may be the current location of the service requester. This could be verified using a radio frequency identification reader 112 and asking the service requester to scan a radio frequency identification over the reader.

Additional controls may include sending a text message to the caller's mobile telephone and asking him to read it to the agent in order to verify that he is indeed the recipient of the message. The service requester could be called on the telephone number given in the enterprise directory for the individual having the identity given by the service requester. The service requester could be asked to provide a signed email from a colleague to prove his identity. The service requester could be required to provide a confidential shared secret code published on the intranet's help desk site. This code could be changed at regular intervals such as every hour.

The processor 107 uses the rules 105 and the responses of the service requester input by the operator into user interface 106 to modify the risk level. Once a predefined number of controls have been actioned, a risk assessment may be made. This would involve determining whether the risk level of the ticket matches (i.e. is less or equal to) the level of the requested service. If the risk level of the ticket is sufficient to perform the requested service the system allows the operator to perform the requested service. This is carried out by the service provision means 108. A risk assessment phase may also include delegating the verification of the service requester to an outside party such as a security investigations bureau or a line manager. The system may also include a facility for the agent or a supervisor to override a automated assessment.

Figure 2:
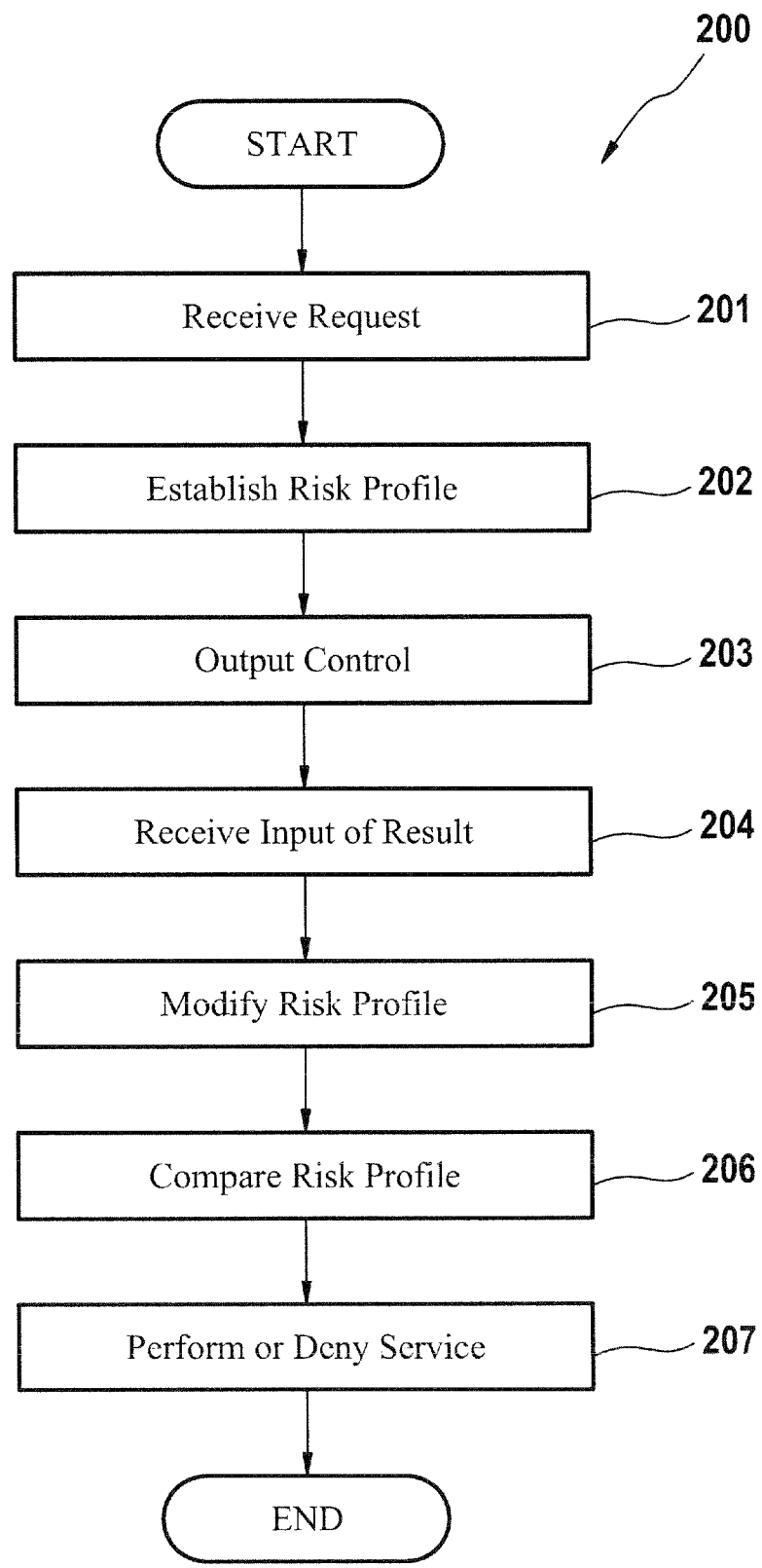
FIG. 2 is a flow diagram illustrating steps involved in a method for providing a service to a service requester according to an embodiment of the present invention.

FIG. 2 shows a flowchart for a method of providing a service to a service requester. In the step 201 a service request is received from the service requester. This may either be through a telephone call or through a website. The method may be implemented as a computer program on a system such as that shown in FIG. 1. Based on the service request an initial risk profile is established in step 202. This may be established using information provided at the website or through an automated telephone service. It may also be established using the nature of the service requested. In step 203 a control is provided to the agent. The control includes a question or action which the service requester is to answer or perform. In step 204 the result of the control is input. This includes the agent inputting the answer given by the service requester to a question. In step 205 the risk profile is modified. This involves reducing the risk or increasing the risk depending on the service requester's answer to a question for example if the service requester incorrectly answers a question the risk profile may be moved from low to medium or medium to high. A number of controls may be output depending on the type of service requested and the service requestor's responses. Thus following step 205, further controls may be output and the method may return to step 203. In step 206 the risk profile is compared with a maximum acceptable risk profile for the service requested. In step 207 the service is performed or denied. The decision on whether to perform or deny the service is made using the comparison of the risk profiles made in step 206.

The verification of the service requester may be delegated to another party, which could be a specialized team at the company, site security located at the requestor's location, this could be the manager of the service requester or an a dedicated security incidents response team. The delegation could take place following the reception of the request in step 201, or following modification of the risk profile in step 205.

Instructions of software described above (including the various modules of FIG. 1) are loaded for execution on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for providing a service to a service requester, the method comprising:

receiving, by a system having a processor, entry of a request of the service requester, the request comprising a requested service;

establishing, by the system, a risk profile level and associating the risk profile level with the request;

outputting, at least one control in response to the request;

receiving, by the system, a response to the control, wherein the control includes a prompt of the service requester to provide information regarding an organization of the service requester, and wherein the information includes information relating to personnel of the organization other than the service requester;

modifying, by the system, the risk profile level using the response and a stored rule;

comparing, by the system, the risk profile level with a target acceptable risk profile level for the requested service; and allowing, by the system, performance of the service if the modified risk profile level does not violate the target acceptable risk profile level.

2. The method of claim 1, wherein the entry of the request includes an identity of the service requester, and the identity of the service requester is used as a key to retrieve data from a database, the data from the database being used as the at least one control.

3. The method of claim 1, further comprising
creating a ticket;
storing the ticket;
wherein the ticket comprises the request, the established risk profile level, a unique identifier and an indication of whether the service was performed.

4. The method of claim 1, wherein outputting the at least one control comprises outputting a second control that includes sending a message to a device of the service requester and prompting the service requester to confirm the message,
wherein modifying the risk profile level further uses a response to the second control.

5. The method of claim 4, wherein prompting the service requester to confirm the message comprises prompting the service requester to read the message to an agent.

6. A nontransitory computer-readable storage medium storing computer executable instructions that when executed by a processor cause the processor to:
receive a service request from a service requester,
establish a risk profile level in response to the service request,
output a control in response to the service request,
receive input of the service requester's response to the control, wherein the control includes a prompt of the service requester to provide information regarding an organization of the service requester, and wherein the information includes information relating to personnel of the organization other than the service requester;
modify the risk profile level using the service requester's response to the control and a predefined rule; and
use the modified risk profile level to determine whether or not to perform a service specified by the service request.

7. The computer-readable storage medium of claim 6, wherein using the modified risk profile level comprises:
comparing the modified risk profile level with an acceptable risk profile level for the service, and
allowing the service to be performed if the modified risk profile level is less than or equal to the acceptable risk profile level.

8. The computer-readable storage medium of claim 6, the established risk profile level being one of a number of predefined levels, and wherein modifying the risk profile level comprises selecting another one of the predefined levels.

9. A data processing system comprising:
a filtering module to receive a request for a service from a service requester;
a management module to create a risk profile level in response to the request, the risk profile level being one of a number of predefined levels;
at least a first and a second rule, the first rule specifying a first control and determining how to change the created risk profile level according to a response to the first control obtained from the service requester, the second rule specifying a target acceptable risk profile level, wherein the first rule further specifies a second control prompting the service requester to provide information regarding an organization of the service requester, wherein the information includes information relating to personnel of the organization other than the service requester;
an interface comprising an input module to input the response of the service requester to the first control, wherein the first control includes sending a message to a device of the service requester and prompting the service requester to confirm the message; and
a processor to modify the created risk profile level according to the first rule and based on responses to the first and second controls, and to compare the modified risk profile level with the target acceptable risk profile level to determine whether or not to allow the service to be performed.

10. The data processing system of claim 9, the filtering module comprising a website or an automated telephone system on which the service requester submits the request for the service.

11. The data processing system of claim 9, further comprising a connection to a radio frequency identification reader at the service requester's location, the system operable to determine whether a radio frequency identification device associated with the service requester is in the vicinity of the radio frequency identification reader.

12. The data processing system of claim 9, wherein the target acceptable risk profile level is a maximum acceptable risk profile level, the data processing system further comprising:
a service provision module to allow the service to be performed in response to determining that the modified risk profile level is less than or equal to the maximum acceptable risk profile level.

13. The data processing system of claim 9, wherein the management module is a ticketing management module, and wherein the ticketing management module is to create a ticket containing the created risk profile level.

14. The data processing system of claim 9, wherein prompting the service requester to confirm the message comprises prompting the service requester to read the message to an agent.

* * * * *

UNITED STATES PATENT AND TRADEMARK OFFICE
CERTIFICATE OF CORRECTION

| | | |
|---|---|---|
| PATENT NO. | : 8,326,654 B2 | Page 1 of 1 |
| APPLICATION NO. | : 12/105417 | |
| DATED | : December 4, 2012 | |
| INVENTOR(S) | : Louisa Saunier | |

It is certified that error appears in the above-identified patent and that said Letters Patent is hereby corrected as shown below:

In the Claims

In column 6, line 56, in Claim 1, after "outputting," insert -- by the system, --.

Signed and Sealed this
Twenty-third Day of April, 2013

Teresa Stanek Rea
*Acting Director of the United States Patent and Trademark Office*